United States Patent [19]

Sasuta

[11] Patent Number: 5,513,381
[45] Date of Patent: Apr. 30, 1996

[54] METHOD FOR PLACING A COMMUNICATION GROUP CALL IN A MULTIPLE SITE TRUNKED SYSTEM

[76] Inventor: Michael D. Sasuta, 1661 Blackburn Dr., Mundelein, Ill. 60060

[21] Appl. No.: 36,620

[22] Filed: Mar. 24, 1993

[51] Int. Cl.$^6$ .................................................. H04B 7/26
[52] U.S. Cl. ..................... 455/34.1; 455/54.2; 455/56.1
[58] Field of Search .............................. 455/33.1, 34.1, 455/34.2, 54.1, 54.2, 56.1, 53.1; 379/59

[56] References Cited

U.S. PATENT DOCUMENTS

| | | | |
|---|---|---|---|
| 4,723,264 | 2/1988 | Sasuta et al. | 455/54.2 |
| 5,101,502 | 3/1992 | Felderman et al. | 455/34.1 |
| 5,287,542 | 2/1994 | Hesse et al. | 455/54.2 |

Primary Examiner—Reinhard J. Eisenzopf
Assistant Examiner—Thanh Le
Attorney, Agent, or Firm—Christopher P. Moreno

[57] ABSTRACT

In a multi-site trunked communication system, a method for allowing a communication unit to place a unit directed group call consists of identifying, by the unit initiating the communication, a target unit and transmitting identification information of the target unit and a group call request to a communication resource allocator. Upon receipt of the identification information and the group call request, the communication resource allocator processes the request and when a resource is available in the site that the target unit is located in, allocates the resource such that the target unit and any other units of the communication group in the site can participate in the group call.

3 Claims, 3 Drawing Sheets

5,513,381

METHOD FOR PLACING A COMMUNICATION GROUP CALL IN A MULTIPLE SITE TRUNKED SYSTEM

FIELD OF THE INVENTION

This invention relates generally to communication systems and, more particularly, to placing a group call in a multiple site trunked communication system.

BACKGROUND OF THE INVENTION

Wide area trunking communication systems are known to comprise a plurality of communication units, a plurality of sites, a limited number of communication resources, and a communication resource allocator. Typically, the plurality of communication units are arranged into communication groups. A wide area trunking communication system allows a communication unit to communicate with its communication group from any site in the system.

A difficulty arises in a wide area trunked communication system, when a member of the communication group is in a site that does not have an available resource. In such situations, one prior art solution was to wait until all sites, currently supporting some portion of the group population, had an available resource and then place the call. This allowed the group call to be fully processed, however, there was the potential of extended wait time while awaiting communication resource availability at all the sites for the call. Another approach was to allow the requesting communication unit to override the busy condition such that the resource allocator need only address resource availability at some pre-determined, select set of sites, instead of all the sites currently supporting some portion of the group population. This has the potential to reduce wait times over that experienced by awaiting resource availability at all the populated sites for this group. See Felderman U.S. Pat. No. 5,101,502 for a further discussion of busy override in a wide area trunked communication system which is incorporated herein.

In many communications, the requesting communication unit does not need to talk to the whole group, rather only a portion of it. Thus, the methods for communicating with a communication group described above waste communication resources and delay access time for small audience calls. Therefore, a need exists for a method that allows a group call to be directed to only a portion of the communication group.

DESCRIPTION OF A PREFERRED EMBODIMENT

In general, this invention provides a method for placing a group call that allows the unit initiating the group call to select a target unit, such that the group call may be processed when a communication resource is available in the site containing the target unit. The unit initiating the group call selects a target unit by transmitting the ID of the target unit in the request for group call service. Upon receipt, the communication resource allocator allocates a resource, when available, for the communication in the site that the target unit is located, and may optionally allocate resources in other sites where units of the same communication group are located if a resource is available in those sites. This unit directed method of placing a group call eliminates the need to wait for an available resource in each site containing a communication unit member, therefore, reducing delays and wasted resources.

Figure 1:
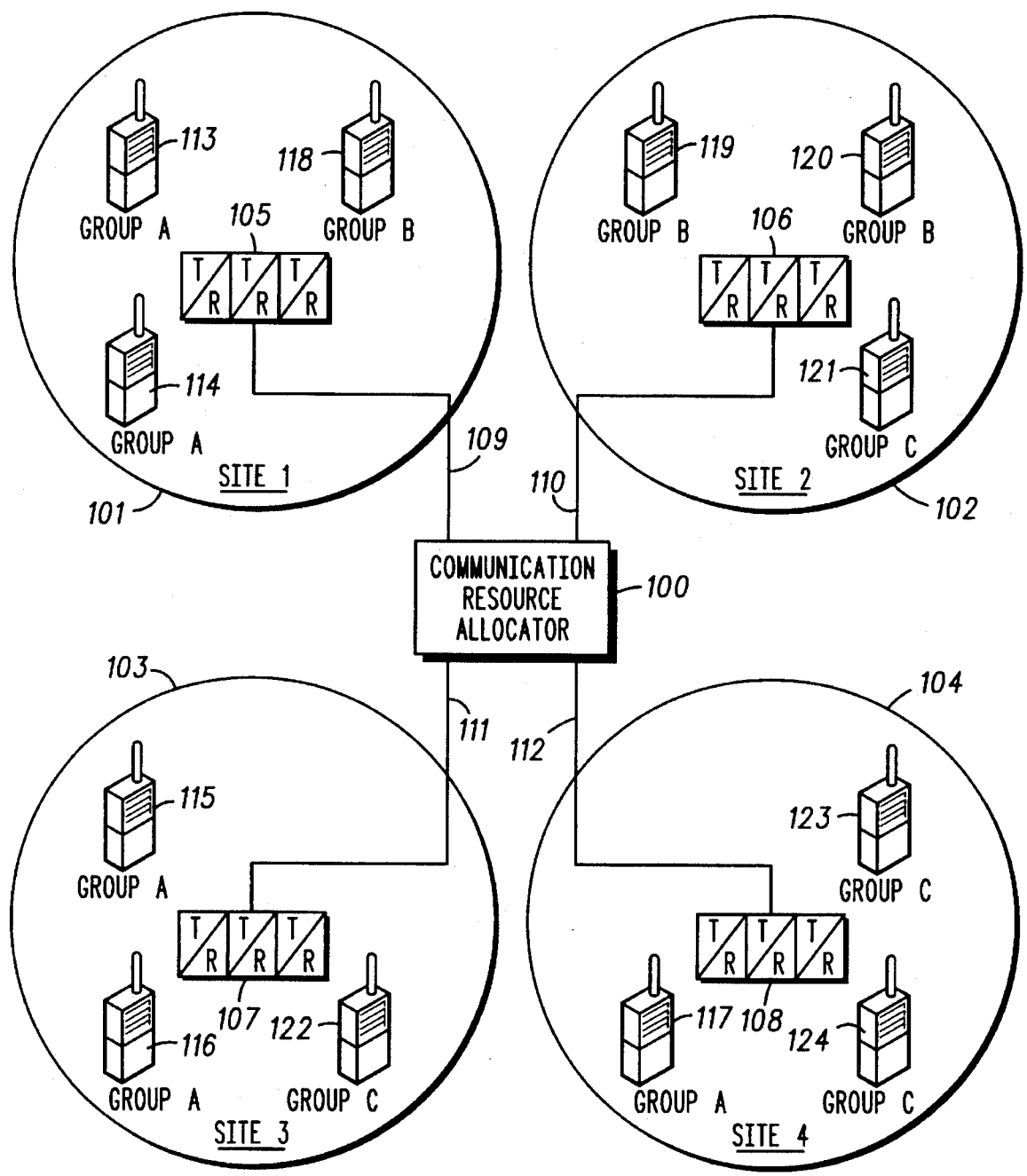
FIG. 1 illustrates a multi-site trunked communication system that may incorporate the present invention.

The invention can be more fully described with reference to FIG. 1, FIG. 2, and FIG. 3. FIG. 1 illustrates a communication system comprising a communication resource allocator 100, a plurality of communication sites (only four shown) 101, 102, 103, 104, a limited number of communication resources 105, 106, 107, 108, at each communication site and communication network links 109, 110, 111, 112. The communication resources are comprised of control channel resources for communication service request and grants, and traffic channel resources for voice communication. The plurality of communication units 113–124 are distributed among the communication sites as shown, but are free to roam from site to site, and are capable of utilizing resources at each site for communication services. The communication units 113–124 depicted in FIG. 1 are members of one of three communication groups, Group A, Group B, or Group C. (FIG. 1 shows only 3 groups for convenience of illustration, however, in practice, any number of groups may be serviced.) Communication Group A is comprised of communication units 113, 114, 115, 116, and 117; communication Group B is comprised of units 118, 119, and 120; and communication Group C is comprised of communication units 121, 122, 123, and 124.

Figure 2:
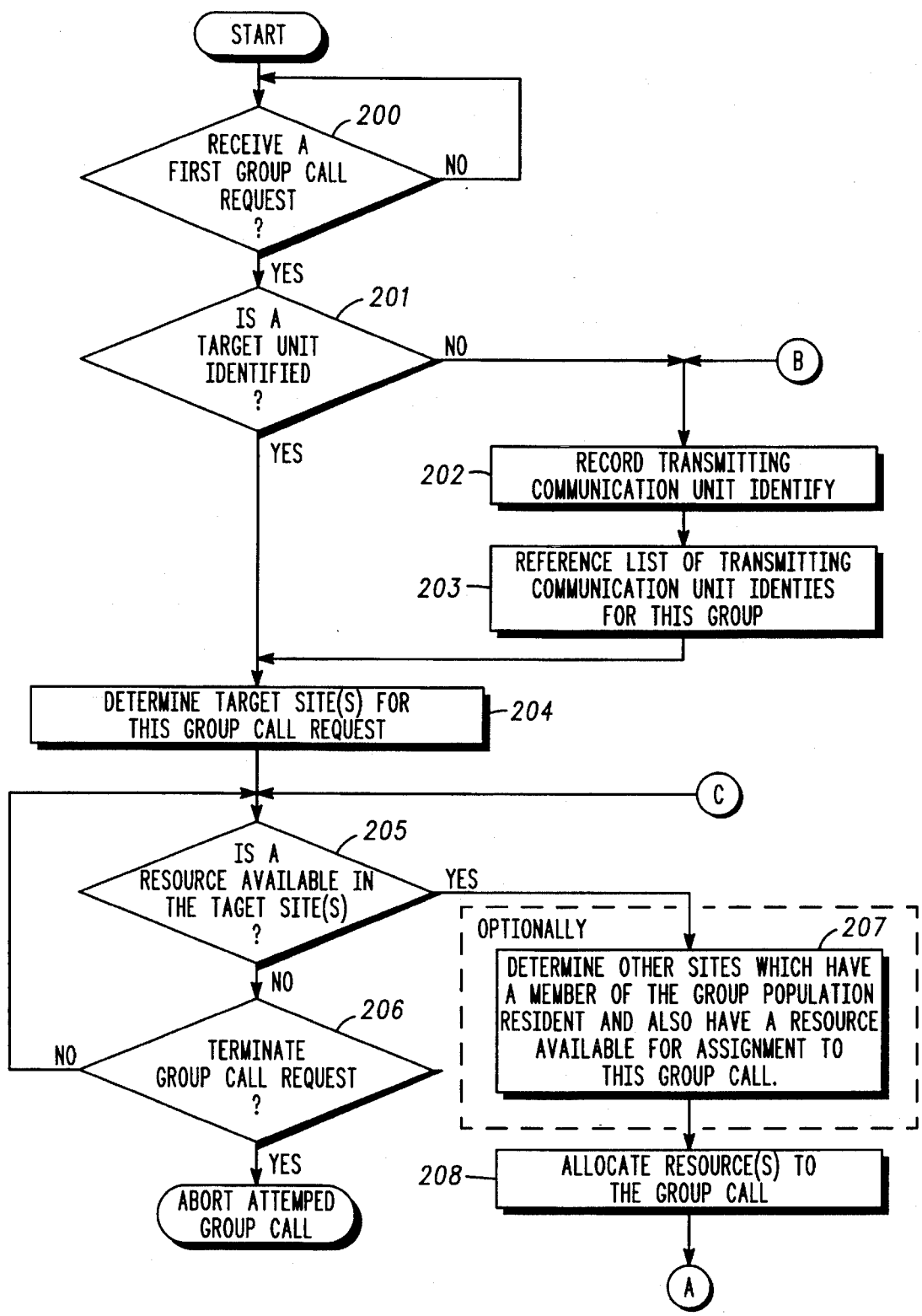
FIG. 2 and FIG. 3 illustrate a logic diagram that may be used to implement the present invention in the multiple site trunked communication system of FIG. 1.

FIG. 2 illustrates a logical flow diagram that the communication resource allocator and communication units may utilize to implement the present invention. Note that the communication resource allocator and/or the communication units may require additional memory and processing devices to store and execute the present invention. At step 200, a requesting communication unit of a particular communication group makes a communication group call request to the communication resource allocator. This group call request includes identification information of the particular communication group and may include identification information of at least one target communication unit of the particular communication group. The communication resource allocator determines if the received group call request indicates a desired target unit for the requested communication group service 201. If a target unit is identified, the communication resource allocator determines which communication site(s) of the communication system need to be involved in the requested group call 204.

Subsequently, the communication resource allocator determines if communication resources are available at the determined communication sites 205. When communication resources are available, the communication resource allocator allocates these communication resources to the group call and allows the communication to take place 208. All members of the communication group located in the targeted communication site and the site that the initiating communication unit is located in will be involved in the communication group call.

Optionally, once communication resource availability has been attained at the target communication sites, the call may be processed to include all other communication sites which have both an available resource and a member of the communication group population 207. This would increase the number of units in the group call to include all communication group members at the initiating group call site, the targeted group call site, and communication group members at additional sites that have a communication resource available.

If resources are not available at the target site(s) 205, the communication resource allocator will repeatedly check for an available resource until either a resource becomes available or the initiating unit terminates the group call request 206.

For clarity, an example of the above follows. Referring again to FIG. 1, communication unit 113 of Site 1 101 requests a group call for group A, indicating unit 117 as the target unit for the group call. Currently communication unit 117 resides at Site 4 104 of the communication system 100. The communication resource allocator 100 determines that the communication sites currently populated by members of the communication group A include sites 1 (101), 3 (103), and 4 (104). However since the call request indicates a desired target unit for the group call, only the initiating site and the target unit site need be involved in the group call. The communication resource allocator then assigns communication resources (105) at Site 1, and communication resources (108) at Site 4 to this group call. The group A communication now may commence and will include the communication units 113 and 114 at Site 1 (101) and communication unit 117, at site 4 (104). Note that communication units 115 and 116 at site 3 (103) are not involved in the requested group call, nor is communication site 2 (102), which does not have an active portion of the communication group A population.

Optionally, assume that a portion of the communication group A populated a non-target site, in this example site 3 (103), that has a communication resource available at the time the group A group call is processed. Communication site 3 (103) will be included in the group call, by allocating a resource, such that communication units 115 and 116 are able to participate in the group A group call communication.

In a general group call request, if a target unit identity has not been supplied at the time of the group call service request, the communication resource allocator cannot direct the call to a particular communication site, but can still compose a semi-private group call for the duration of this particular group call activity. Referring again to FIG. 2, if a target unit is not identified, the communication resource allocator will record the identity of the initiating communication unit as a transmitting communication unit affiliated with this particular communication group for future reference 202. The communication resource allocator references a current list of all recently transmitting communication units for this particular communication group 203. The communication sites containing the recently transmitting communication units compose the necessary set of sites to be involved in the group call. By default, if this is the first transmission for this group, include all communication sites containing communication group units in the group call and begin to construct a new recent transmitting unit list for this particular communication group. The communication resource allocator will determine when communication resources are available at the indicated communication sites, and when all sites have available resources, the communication resource allocator will process the group call request.

The list of recently transmitting communication units associated with a particular communication group is only retained for a predetermined period of time. The entries in the list will be retained as long as new group call activity for this particular communication group continues. Once call activity lapses for a predetermined period of time, typically tens of seconds or less, the entries in the list are deleted. The next group call request for this communication group, which does not indicate a unique target unit, will, by default, include all communication sites containing communication group units in the group call and begin to construct a new recent transmitting unit list for this particular communication group.

Figure 3:
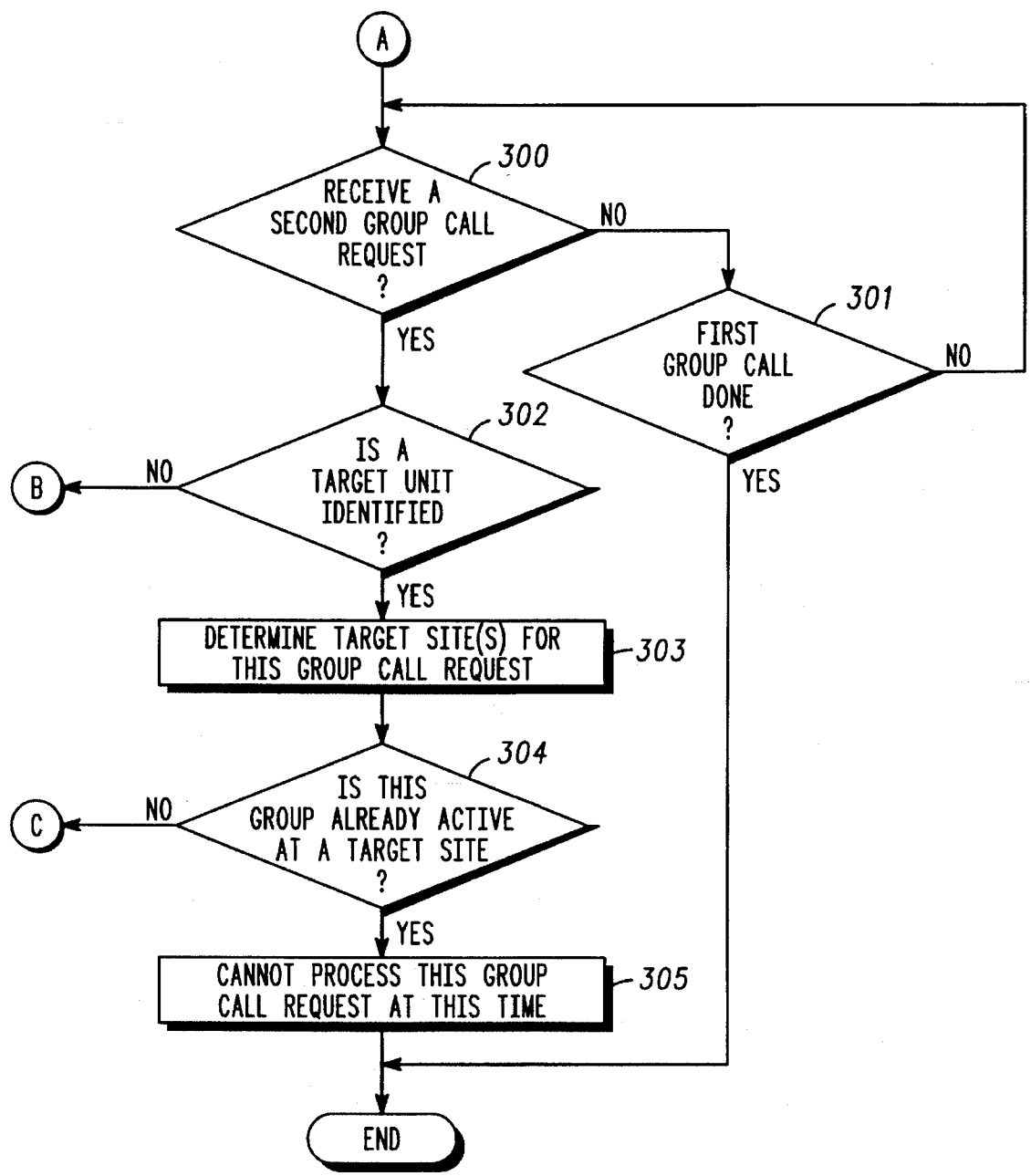

FIG. 3 illustrates a logic diagram that allows the communication system to support multiple communications within the same communication group. At step 300, the communication resource allocator receives a second group call request from a second requesting unit and determines that at least one second target unit is identified 302. The target communication sites necessary to complete this second group call are determined by the communication resource allocator 303. The communication resource allocator then determines if any of the indicated second target sites are presently involved in a previous group call involving the group associated with this second group call request 304. If a second target site is involved in a previous group call for the group associated with this second group call request, the second group call request can not be processed at this time 305. If there is no conflicting group activity, the resource allocator will process the second group call in the same manner the first group call was processed (see FIG. 2 steps 205, 207, and 208).

Assume the above communication group A group call example is active, with the exception that the optional portion involving additional sites has not been enabled. The group call includes the initiating unit 113 and unit 114 at site 1 (101) and target unit 117 at site 4 (104). Note that communication units 115 and 116 at site 3 (103) are not involved in the group call. Now assume that while the first group A group call is active, unit 115 at site 3 requests a second group A group call indicating unit 116 as the intended target unit (second target unit identity). Since both initiating unit 115 and the target unit 116 are resident at site 3 (103), which is not involved in the first group A group call, the second group A group call will be processed, while the first group call is active, if resources are available at site 3 103.

The present invention provides a method for placing a communication unit directed group call in a manner that reduces system access time. This is achieved by excluding some communication group members from the group call while guaranteeing the inclusion of certain other communication units (i.e. targeted units). This invention also allows a portion of the communication group to place a group call involving a limited number of communication units, while another group call is taking place in different sites.

I claim:

1. In a multi-site trunked communication system that includes a plurality of communication units arranged into communication groups, a plurality of sites, a limited number of communication resources for use in each site of the plurality of sites, and a communication resource allocator, wherein members of a particular communication group are located throughout the multi-site trunked communication system, a method for placing a communication group call, the method comprises the steps of:

a) initiating, by a requesting communication unit of the particular communication group, a group call by transmitting to the communication resource allocator a group call request that includes identification information of the particular communication group and identification information of at least one target communication unit, wherein at least two communication units receiving the group call are located in different sites;

b) identifying, by the communication resource allocator upon reception of the group call request, a target site, wherein the at least one target communication unit is located at the target site;

c) determining, by the communication resource allocator, whether a communication resource is available in the target site;

d) when the communication resource is available in the target site, allocating the communication resource to the particular communication group; and e) transmitting, by the requesting communication unit, a communication to the at least one target communication unit and any other communication units affiliated with the particular communication group that are located in the target site via the allocated communication resource.

2. The method of claim 1 further comprises the steps of:

f) identifying, by the communication allocator, other sites, wherein members of the particular communication group are located at the other sites:

g) determining, by the communication resource allocator, whether a communication resource is available in each site of the other sites;

h) for each site of the other sites that has an available communication resource, allocating, by the communication resource allocator, the available communication resource to the particular communication group; and i) transmitting, by the requesting communication unit, the communication to the members of the particular communication group via the allocated available communication resources.

3. The method of claim 1 further comprises the steps of:

f) initiating, by a second requesting communication unit of the particular communication group while the group call is still active, a second group call by transmitting to the communication resource allocator a second group call request that includes identification information of at least one second target communication unit;

g) identifying, by the communication resource allocator upon reception of the second group call request, a second target site, wherein the at least one second target communication unit is located at the second target site:

h) provided that the second target site is not the same site as the target site, allocating a second communication resource in the second site when the second communication resource is available; and i) transmitting, by the second requesting communication unit, a second communication to the at least one second target communication unit via the second communication resource while the communication is active.

* * * * *